US012753728B2

(12) United States Patent
Takaki et al.

(10) Patent No.: US 12,753,728 B2
(45) Date of Patent: Oct. 6, 2026

(54) PURGE VALVE CONTROL METHOD AND CONTROL DEVICE OF EVAPORATED FUEL PROCESSING DEVICE

(71) Applicant: NISSAN MOTOR CO., LTD., Yokohama (JP)

(72) Inventors: Daisuke Takaki, Kanagawa (JP); Hirofumi Tsuchida, Kanagawa (JP); Katsuhito Takahashi, Kanagawa (JP); Shigemasa Shimojo, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 301 days.

(21) Appl. No.: 18/713,335

(22) PCT Filed: Nov. 25, 2021

(86) PCT No.: PCT/JP2021/043105

§ 371 (c)(1),
(2) Date: May 24, 2024

(87) PCT Pub. No.: WO2023/095225

PCT Pub. Date: Jun. 1, 2023

(65) Prior Publication Data

US 2026/0201847 A1 Jul. 16, 2026

(51) Int. Cl.
*F02D 41/00* (2006.01)
*F02M 25/08* (2006.01)

(52) U.S. Cl.
CPC ....... *F02D 41/0032* (2013.01); *F02D 41/004* (2013.01); *F02M 25/0836* (2013.01); *F02M 2025/0845* (2013.01)

(58) Field of Classification Search
CPC .............. F02D 41/0032; F02D 41/004; F02M 25/0836; F02M 2025/0845
See application file for complete search history.

(56) References Cited

U.S. PATENT DOCUMENTS 5,429,098 A * 7/1995 Tomisawa ............. F02D 41/004 123/520
5,682,863 A * 11/1997 Kadooka ............... F02D 41/004 123/520

(Continued)

FOREIGN PATENT DOCUMENTS

JP H05-10767 U 2/1993
JP H05-332205 A 12/1993

(Continued)

*Primary Examiner* — Erick R Solis
(74) *Attorney, Agent, or Firm* — Foley & Lardner LLP

(57) ABSTRACT

An evaporative fuel processing device includes a purge valve disposed in a purge passage between a canister and an intake passage of an internal combustion engine and configured to be duty-controlled. For this device, a purge valve control method is provided which includes: synchronizing a cycle, in which the purge valve is opened, with rotation of the engine; setting a valve opening interval at one half of an odd number times an intake stroke interval, wherein the valve opening interval is from a start point of a first opening time period of the purge valve to a start point of a second opening time period of the purge valve, wherein the intake stroke interval is determined by a number of cylinders of the engine; and setting the odd number to (2·C+1), wherein C represents the number of cylinders of the engine.

11 Claims, 4 Drawing Sheets

(56) References Cited

U.S. PATENT DOCUMENTS

| | | | | |
|---|---|---|---|---|
| 2002/0152997 | A1 * | 10/2002 | Buhl | F02D 41/004 123/518 |
| 2006/0037588 | A1 * | 2/2006 | Osanai | F02M 25/089 123/520 |
| 2019/0360434 | A1 * | 11/2019 | Dudar | F02M 25/0854 |

FOREIGN PATENT DOCUMENTS

| | | | |
|---|---|---|---|
| JP | H06-272628 | A | 9/1994 |
| JP | 2004-270627 | A | 9/2004 |
| JP | 2015-135081 | A | 7/2015 |

* cited by examiner

PURGE VALVE CONTROL METHOD AND CONTROL DEVICE OF EVAPORATED FUEL PROCESSING DEVICE

TECHNICAL FIELD

The present invention relates to an evaporative fuel processing device employing a canister, and particularly to control of a purge valve provided in a purge passage between the canister and an intake passage of an internal combustion engine.

BACKGROUND ART

Conventionally, an evaporative fuel processing device is commonly used in order to prevent evaporative fuel, which occurs in a vehicle fuel tank, from leaking outside. The evaporative fuel processing device is configured to temporarily adsorb evaporative fuel in a canister employing an adsorbent such as activated carbon, and thereafter, while an internal combustion engine is operating, purge a fuel component from the canister by introduction of fresh air, and introduce the fuel component into an intake system of the internal combustion engine. In general, the purge valve provided in the purge passage is duty-controlled at a suitable driving frequency in order to control a flow rate of purge gas introduced into an intake passage of the internal combustion engine.

In such an evaporative fuel processing device, a quantity of purge gas is measured based on a pressure difference across a purge valve in a purge passage, and a time period in which the purge valve is opened (namely, duty ratio). However, in an intake passage to which the purge passage is connected, an intake pulsation occurs which has a cycle time depending on a number of cylinders. The intake pulsation has a relatively small influence, when an average pressure in the intake passage is sufficiently low and the pressure difference across the purge valve is large, such as when an internal combustion engine is undergoing a relatively low load.

However, in a situation where a supercharged internal combustion engine is in a range of supercharging, or in a situation where a naturally-aspirated internal combustion engine is in a range of high load, a pressure difference (average pressure difference) across a purge valve is small so that an intake pulsation has a relatively large influence. This causes a problem that a purge gas flow rate varies depending on a relationship between the intake pulsation and a time period in which the purge valve is opened.

Patent Documents 1 and 2 disclose techniques in which a plurality of purge valves are arranged in parallel with each other and time periods in which the purge valves are opened are shifted to have phases different from each other in order to shorten a cycle time of opening and closing as a whole. However, these documents are silent about the problem of the influence of intake pulsation and means for solving the problem.

PRIOR ART DOCUMENT(S)

Patent Document(s)

Patent Document 1: Japanese Utility Model Application Publication No. H5-10767

Patent Document 2: Japanese Patent Application Publication No. H5-332205

SUMMARY OF INVENTION

According to the present invention, a purge valve control method for an evaporative fuel processing device, wherein the evaporative fuel processing device includes at least one purge valve disposed in a purge passage between a canister and an intake passage of an internal combustion engine and configured to be duty-controlled, the purge valve control method includes: synchronizing a cycle, in which the at least one purge valve is opened, with rotation of the internal combustion engine; and setting an interval at one half of an odd number times a quantity (ΔREF), wherein the interval is from a start point of a first opening time period of the at least one purge valve to a start point of a second opening time period of the at least one purge valve, wherein the second opening time period follows the first opening time period, wherein the quantity (ΔREF) is an intake stroke interval determined by a number of cylinders of the internal combustion engine. The odd number is set to $(2 \cdot C+1)$, wherein C represents the number of cylinders of the internal combustion engine.

Inside the intake passage, an intake pulsation occurs, which has a cycle time determined by the number of cylinders connected to the intake passage. Pressure in the intake passage increases and decreases repeatedly in relation to the intake stroke of each cylinder. For example, in a simplified waveform, two adjacent peaks of the intake pulsation have an interval equal to ΔREF. Since the interval from the start point of the first opening time period to the start point of the second opening time period following the first opening time period is set equal to an odd multiple of ΔREF/2, the second opening time period starts with a valley of the intake pulsation waveform, if the first opening time period starts with a peak of the intake pulsation waveform.

This serves to cancel the influence of intake pulsation at least partially, and thereby control the purge gas flow rate stably in accordance with the duty ratio.

MODE(S) FOR CARRYING OUT INVENTION

Figure 1:
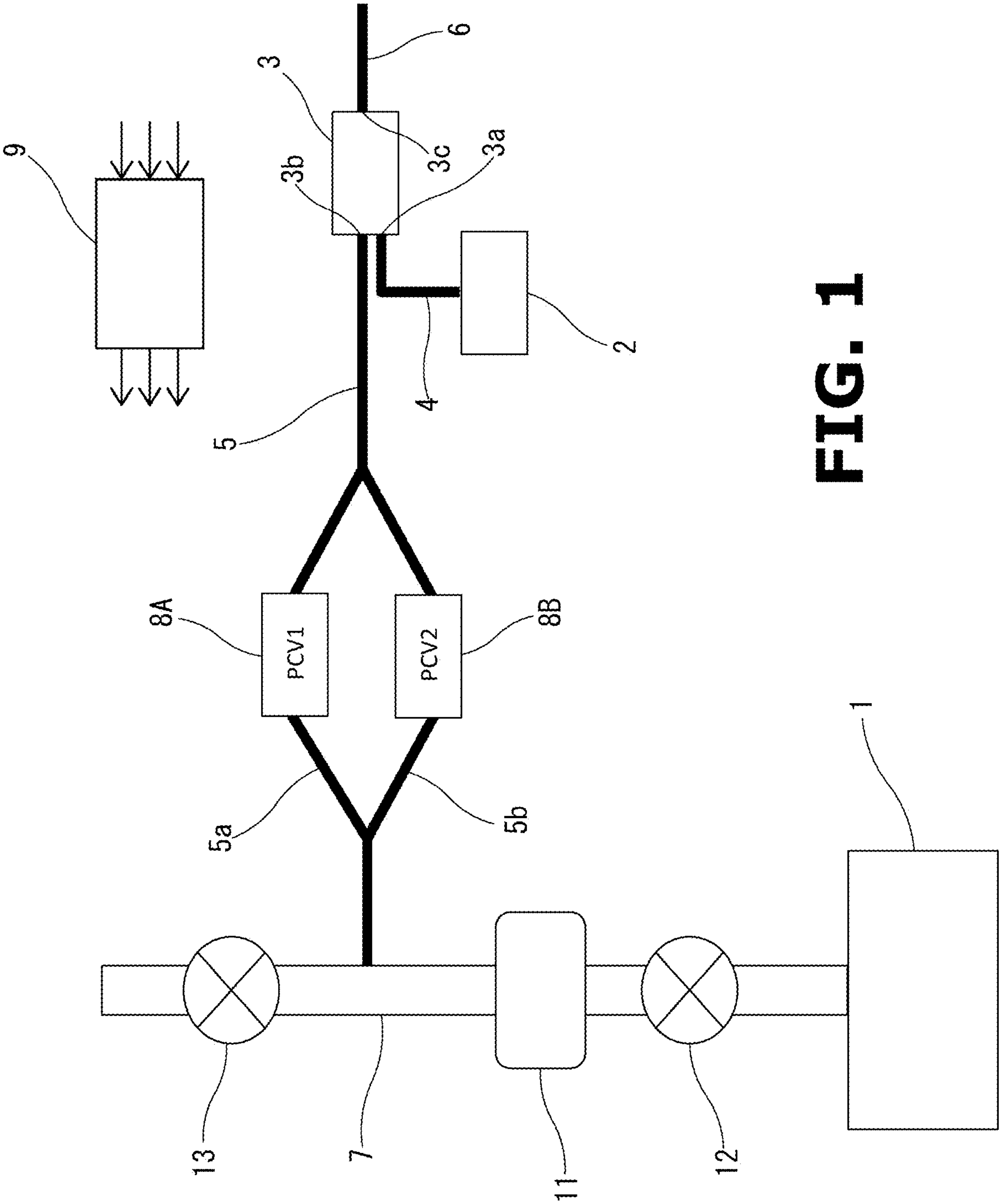
FIG. 1 is an explanatory diagram showing configuration of an evaporative fuel processing device according to the present invention.

The following describes an embodiment of the present invention in detail with reference to the drawings. FIG. 1 is an explanatory diagram schematically showing configuration of an evaporative fuel processing device in a vehicle equipped with an internal combustion engine 1. The evaporative fuel processing device serves to process evaporative fuel, which occurs in a fuel tank 2 of the vehicle while the vehicle is at rest or the like, while preventing the evaporative fuel from leaking outside. The evaporative fuel processing device is composed mainly of a canister 3 whose inside is filled with an adsorbent such as activated carbon for temporarily storing the evaporative fuel. The canister 3 includes an internal flow path which has a charge port 3*a* and a purge port 3*b* at its first end and a drain port 3*c* at its second end. The charge port 3*a* communicates with an upper space of the fuel tank 2 via a charge passage 4, whereas the purge port 3*b* communicates with an intake passage 7 of the internal combustion engine 1 via a purge passage 5. Furthermore, the drain port 3*c* is opened to the atmosphere via a drain passage 6. The drain passage 6 may be provided with a drain cut valve not shown for leakage inspection and the like.

For example, while the vehicle is at rest or is being refueled, evaporative fuel occurs, and is introduced into the canister 3 through the charge passage 4, and is adsorbed by adsorbents in various parts while flowing through the adsorbents toward the drain port 3*c*. When atmospheric air is taken in through the drain passage 6 by a negative pressure occurring in an intake system during operation of the internal combustion engine 1, the thus adsorbed fuel component is purged from the adsorbents, and is introduced through the purge passage 5 into the intake system of the internal combustion engine 1, and is finally burnt in combustion chambers of the internal combustion engine 1 together with fuel supplied from fuel injection valves.

In the shown example, the internal combustion engine 1 is a four-stroke cycle spark ignition engine, such as an in-line three-cylinder turbocharged engine. Accordingly, the intake passage 7 of the internal combustion engine 1 is provided with a compressor 11 of a turbocharger. A throttle valve 12 is disposed downstream of the compressor 11. Furthermore, an admission valve 13, which is composed of a butterfly valve or the like, is disposed in the intake passage 7 upstream of the compressor 11, for generating a negative pressure in the intake passage 7. The purge passage 5 has an end connected to the intake passage 7 between the admission valve 13 and the compressor 11. Therefore, even when in a supercharging region, some negative pressure is produced by action of the admission valve 13, so that purging of the canister 3, namely, introduction of purge gas into the intake passage 7, can be implemented by a pressure difference between the negative pressure and the atmospheric pressure on the drain passage 6 side.

The purge passage 5 is provided with a pair of purge valves 8, wherein each purge valves 8 is composed of an electromagnetic valve for purge gas flow rate control. Specifically, the purge passage 5 includes a section branched into a pair of purge passages 5*a* and 5*b* parallel with each other, wherein a first purge valve 8A is disposed in the purge passage 5*a*, and a second purge valve 8B is disposed in the purge passage 5*b*. Namely, the two purge valves 8A and 8B are arranged in parallel with each other. It is desirable that the pair of branched purge passages 5*a* and 5*b* have equal lengths. In particular, it is desirable that a section of the purge passage 5*a* between the purge valve 8A and the intake passage 7 is equal in length to a section of the purge passage 5*b* between the purge valve 8B and the intake passage 7. In other words, a length of passage from the end opening of the purge passage 5, which is connected to the intake passage 7, to the purge valve 8A is equal to a passage length from the end opening of the purge passage 5 to the purge valve 8B. This results in that an intake pulsation reaching the purge valve 8A and an intake pulsation reaching the purge valve 8B have equivalent influences.

The purge valves 8A and 8B are duty-controlled by a controller 9. In this example, the controller 9 is configured as a part of an engine controller that performs various controls of the internal combustion engine 1, wherein the controls include a fuel injection control, an ignition control, a control of opening of the throttle valve 12, a control of opening of the admission valve 13, etc.

The duty control according to the present embodiment is performed such that the cycle time of opening of the purge valves 8A and 8B is synchronized with rotation (crank angle) of the internal combustion engine 1. In other words, the driving frequency of the duty control is set to vary in accordance with the rotational speed of the internal combustion engine 1, wherein drive pulse signals are outputted at predetermined crank angles.

Figure 2:
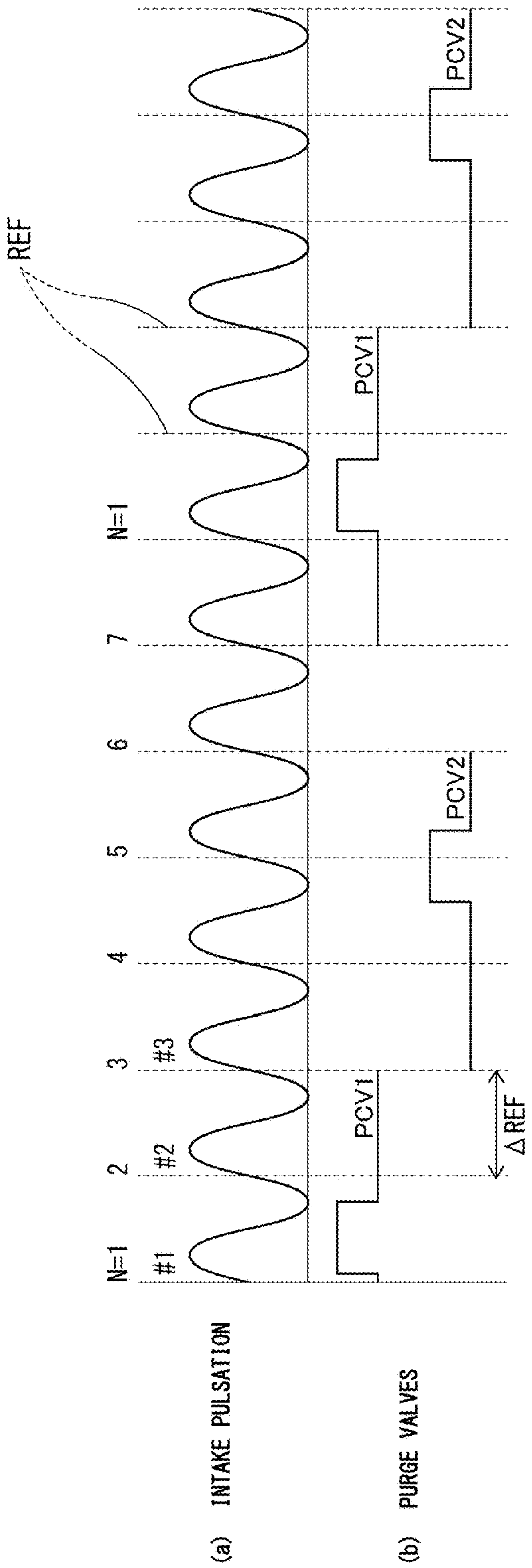
FIG. 2 is a time chart showing a relationship between a waveform of intake pulsation and time periods in which first and second purge valves are opened.

FIG. 2 is a time chart showing a relationship between (a) a waveform of intake pulsation in the intake passage 7 and (b) time periods in which the first and second purge valves 8A and 8B are opened. In FIG. 2, "PCV1" and "PCV2" represent the first and second purge valves 8A and 8B, respectively. Furthermore, "#1", "#2", and "#3" are cylinder numbers. In this example, ignition is carried out in the order of "#1→#2→#3".

The intake pulsation is caused by a process that each cylinder of the internal combustion engine 1 intermittently undergoes its intake stroke. The cycle time or frequency of the intake pulsation is determined by the number of cylinders sharing the intake passage 7. In the four-stroke cycle in-line three-cylinder engine, intake strokes occur every 240° CA (crank angle), causing an intake pulsation with a pressure waveform peaking every 240° CA, as shown in FIG. 2 (*a*). Accordingly, when expressed in terms of crank angle, an intake stroke interval ΔREF is equal to 240° CA. It is to be noted that that the waveform of intake pulsation shown in FIG. 2 (*a*) is in a simplified form for easy understanding. The crank angle of the internal combustion engine 1 is sensed by a so-called crank angle sensor or cam angle sensor not shown. Based on an output signal from the sensor, a REF signal is obtained every 240° CA (crank angle) as a reference for fuel injection timing control and ignition timing control of each cylinder. In other words, the intake stroke interval ΔREF is an interval from a REF signal for a certain cylinder (for example, cylinder #1) to a REF signal for the next cylinder (for example, cylinder #2) in the ignition order. In FIG. 2, broken lines each indicate the timing of the REF signal for each cylinder. For example, the REF signal is outputted a certain crank angle before the compression top dead center of each cylinder. In the present invention, the intake stroke interval ΔREF may be handled in actual time instead of crank angle.

Each of the first purge valve 8A and the second purge valve 8B is driven at intervals of an odd multiple of ΔREF. In other words, the cycle time of the drive pulse signal is equal to an odd multiple of ΔREF. More preferably, the odd number is equal to $2 \cdot C+1$, where C represents the number of cylinders. In case of the in-line three-cylinder engine according to the embodiment, the cycle time of the drive pulse signal for each of the first purge valve 8A and the second purge valve 8B is equal to seven times ΔREF.

Furthermore, the driving pulse signal for the first purge valve 8A and the driving pulse signal for the second purge valve 8B have rising edges that are different from each other by half the cycle time described above. Namely, in the in-line three-cylinder engine according to the embodiment, the phase difference between each drive pulse signal of the duty control of the first purge valve 8A and each drive pulse signal of the duty control of the second purge valve 8B is equal to (ΔREF×7/2). Accordingly, for an overall purge system including the two purge valves 8A and 8B, the interval between the start point of one opening time period and the start point of the next opening time period is equal to (ΔREF×7/2).

FIG. 2 (*b*) shows opening time periods of the first and second purge valves 8A and 8B based on the drive pulse signals. For ease of understanding, an example is shown in which the duty ratio is relatively small. Preferably, the first purge valve 8A and the second purge valve 8B are driven with equal duty ratios. As described above, the start point of the opening time period of the first purge valve 8A and the start point of the opening time period of the second purge valve 8B are shifted from each other by half the cycle time of each purge valve, wherein the cycle time is equal to an odd multiple of ΔREF. Accordingly, as illustrated, the first opening time period of the first purge valve 8A contains a section in which the intake pulsation waveform falls from a peak to a valley, and the following first opening time period of the second purge valve 8B includes a section in which the intake pulsation waveform rises from a valley to a peak. Therefore, the influence of intake pulsation on the purge gas flow rate is substantially canceled out by the first purge valve 8A and the second purge valve 8B, wherein the purge gas flow rate depends on the pressure difference across the purge valves 8A and 8B.

Specifically, when behavior of the intake pulsation deviates slightly back and forth with respect to REF, and the purge gas flow rate during the opening time period of the first purge valve 8A (in the section where the intake pulsation waveform descends from a peak to a valley) decreases, the purge gas flow rate during the following opening time period of the second purge valve 8B (in the section where the intake pulsation waveform rises from a valley to a peak) increases. When the purge gas flow rate during the opening time period of the first purge valve 8A increases, the purge gas flow rate during the opening time period of the second purge valve 8B decreases. The behavior of the intake pulsation with respect to REF varies somewhat depending on propagation velocity of pressure waves (sound velocity in the intake passage).

Therefore, even in situations where the pressure difference (average pressure difference) across the purge valve 8 is small, such as when in the supercharging region, it is possible to suppress the purge gas flow rate from varying due to the influence of intake pulsation, and thereby control the purge gas flow rate stably in accordance with the duty ratio.

In particular, in the embodiment described above, the opening time periods of the two purge valves 8A and 8B in the in-line three-cylinder engine are set to have a phase difference of (ΔREF×7/2) from each other, taking into account the number of cylinders. Accordingly, as illustrated in FIG. 2, if the first opening time period of the first purge valve 8A contains a section of descending from a peak corresponding to the cylinder #1 to a valley, the following opening time period of the second purge valve 8B contains a section of rising from a valley corresponding to the cylinder #1 to a next peak corresponding to the cylinder #2. Namely, it corresponds to the intake stroke of the next cycle of the same cylinder, so that, even during a transient situation in which operating conditions (rotational speed and load) of the internal combustion engine 1 are changing, it is possible to suppress the influence of intake pulsation more accurately. Furthermore, the next opening time period of the first purge valve 8A contains a section of descending from a peak corresponding to the cylinder #2 to a valley, and the following opening time period of the second purge valve 8B contains a section of rising from a valley corresponding to the same cylinder #2 to a next peak corresponding to the cylinder #3. Furthermore, the next opening time period of the first purge valve 8A contains a section of descending from a peak corresponding to the cylinder #3 to a valley, and the following opening time period of the second purge valve 8B contains a section of rising from a valley corresponding to the same cylinder #3 to a next peak corresponding to the cylinder #1. In this way, the opening time period of the first purge valve 8A and the opening time period of the second purge valve 8B change sequentially to correspond to cylinders #1 to #3, thereby also smoothing out effects of variation in intake pulsation among cylinders.

Figure 3:
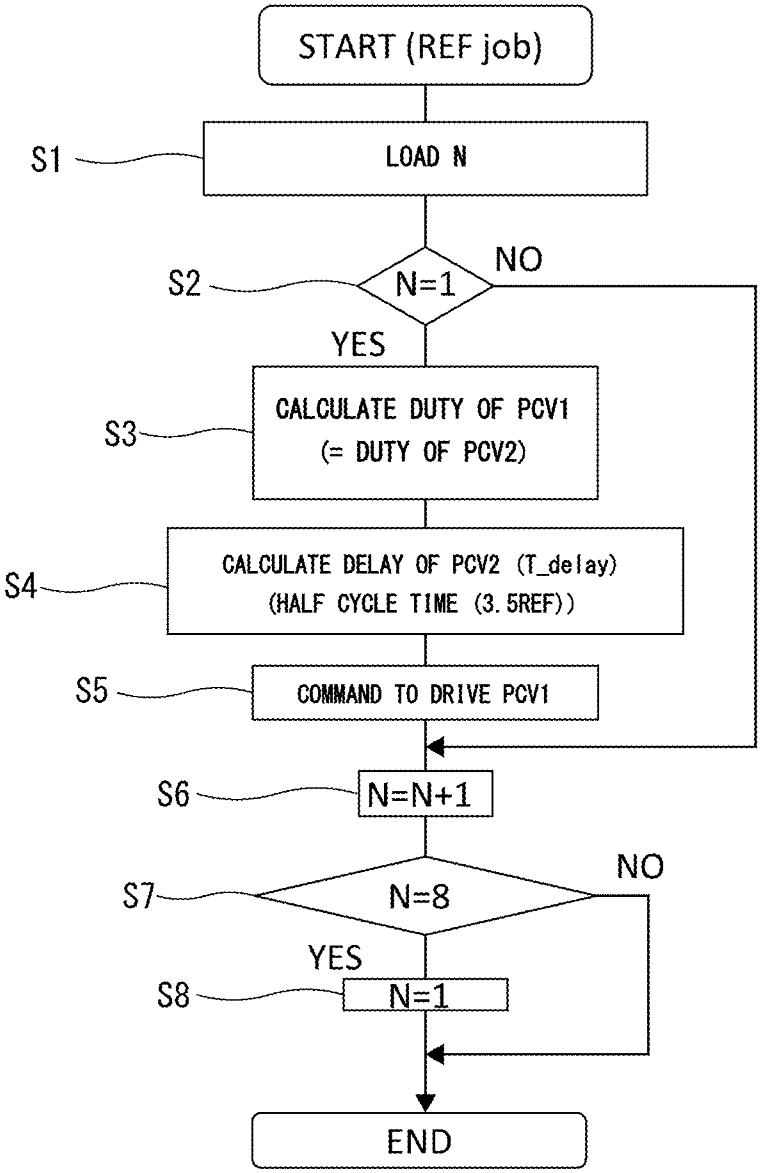
FIG. 3 is a main flowchart showing a purge valve control according to an embodiment.

FIG. 3 shows a main flowchart showing a purge valve control according to one embodiment. The routine of this main flowchart is executed in synchronization with REF signals outputted every 240° CA. At Step 1, a value of a counter N indicating the number of REF signals is read. At Step 2, it is determined whether or not N is equal to 1. When N is equal to 1, the process proceeds to Step 3, where the duty ratio of the first purge valve 8A is calculated based on a requested purge gas flow rate. The duty ratio is a ratio of an opening time period in one cycle time, and corresponds to the width of one opening time period shown in FIG. 2 (*b*). In a preferred embodiment, the duty ratio of the second purge valve 8B is equal to that of the first purge valve 8A.

At Step 4, a delay T_delay is calculated, which is a delay from the start point of the opening time period of the first purge valve 8A to the start point of the opening time period of the second purge valve 8B. As described above, the delay T_delay is equal to (ΔREF×3.5) in one embodiment. Then, the process proceeds to Step 5, where a driving command is transmitted to the first purge valve 8A. Namely, one drive pulse signal is outputted to the first purge valve 8A. Accordingly, the first purge valve 8A opens and closes as shown in FIG. 2 (*b*).

Next, at Step 6, the counter N is incremented, and at Step 7, it is determined whether or not the value of the counter N has reached 8. When the value of the counter N is less than 8, the routine is terminated. When the value of the counter N has reached 8, the process proceeds to Step 8, where the value of the counter N is initialized to 1.

When it is not determined at Step 2 that N=1, the process proceeds from Step 2 to Step 6. Accordingly, the process of Steps 3 to 5 is executed only once every seven times in the routine of FIG. 3, so that the opening time period of the first purge valve 8A is set in synchronization with rotation of the internal combustion engine 1, wherein the cycle time is equal to 7 times ΔREF.

Figure 4:
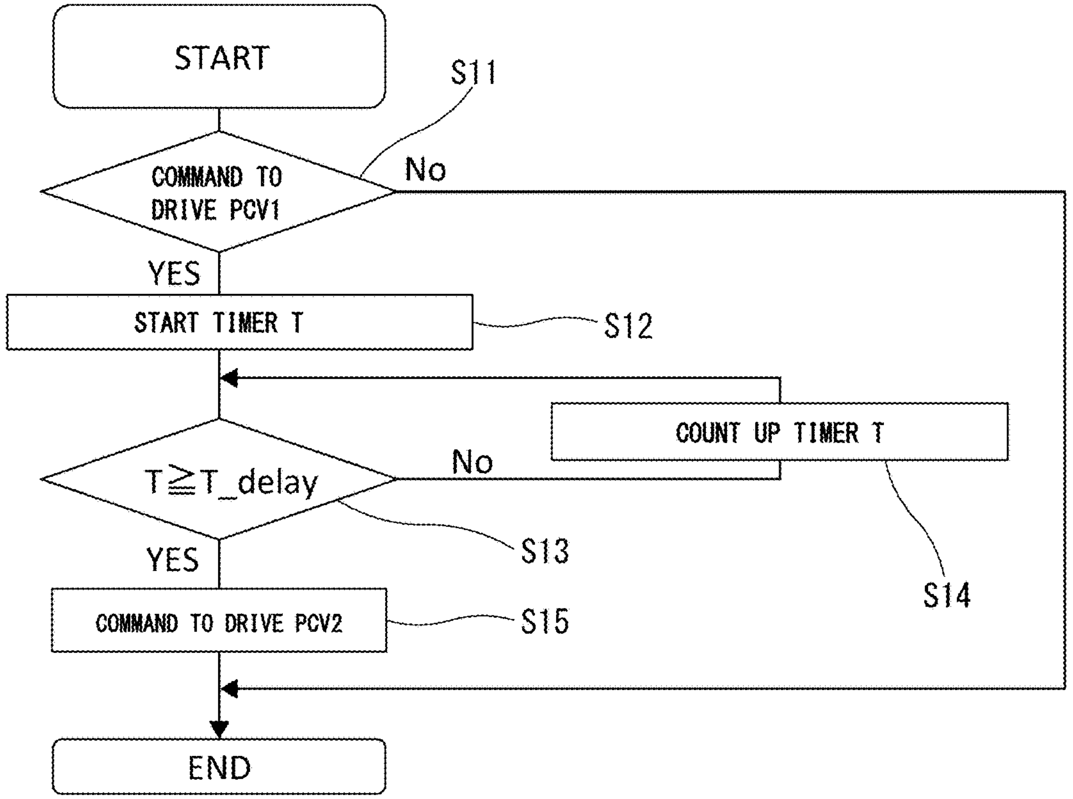
FIG. 4 is a flowchart showing a control of drive timing of the second purge valve.

FIG. 4 is a flowchart showing a control of driving timing of the second purge valve. For example, the routine of FIG. 4 is executed at every minute time. At Step 11, it is determined whether or not a driving command has been transmitted to the first purge valve 8A. In case of NO, the routine is terminated.

When a driving command has been transmitted to the first purge valve 8A, a timer T is started at Step 12. In other words, the timer T is initialized to zero. Then, at Step 13, it is determined whether or not the timer T has a value greater than or equal to the delay T_delay calculated at Step 4. In case of NO, counting-up of the timer T is repeatedly executed at Step 14.

When "T≥T_delay" is satisfied at Step 13, the process proceeds to Step 15, where a drive command is transmitted to the second purge valve 8B. Namely, one drive pulse signal is outputted to the second purge valve 8B. Thereby, as shown in FIG. 2 (*b*), the second purge valve 8B opens and closes with a delay of the half cycle time from the first purge valve 8A.

The duty control of the purge valve 8 described above may be based on the crank angle or may be based on actual time.

Figure 5:
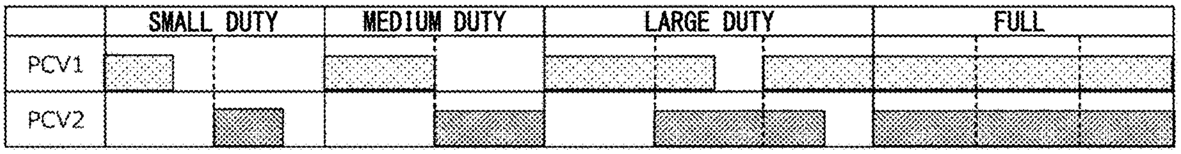
FIG. 5 is an explanatory diagram showing examples of opening time periods for cases with different duty ratios.

FIG. 5 is an explanatory diagram showing examples of opening time periods for cases with different duty ratios. As described above, the second purge valve 8B (PCV2) opens the half cycle time later than the first purge valve 8A (PCV1). In FIG. 5, only one cycle to 1.5 cycles are extracted and shown. As indicated as "Small Duty", when the duty ratio is small, the opening time period of the first purge valve 8A and the opening time period of the second purge valve 8B do not overlap each other. As indicated as "Middle Duty", when the duty ratios are equal to 50%, two opening time periods are alternate and continuous as a whole. As indicated by "Large Duty", when the duty ratio is further larger, the opening time period of the first purge valve 8A and the opening time period of the second purge valve 8B partially overlap each other. Furthermore, "Full" indicates a case where the duty ratio is equal to 100%.

In the embodiment described above, the pair of purge valves 8A and 8B are alternately opened. However, a configuration is also possible in which a larger number of purge valves 8 are provided in parallel. Furthermore, the present invention may be similarly applied to a configuration in which the purge passage 5 is provided with a single purge valve 8. Namely, by setting the cycle time of drive pulsing of the single purge valve 8 to an odd multiple of ΔREF/2, such as (ΔREF×3.5), it is possible to produce an effect of canceling out the intake pulsation similarly as in the embodiment described above with reference to FIG. 2. Specifically, the interval between the start point of one opening time period and the start point of the next opening time period is equal to (ΔREF×3.5), and as shown in FIG. 2, the first opening time period contains a section where the intake pulsation waveform descends from a peak to a valley, and the following opening time period contains a section where the intake pulsation waveform rises from a valley to a peak for the next cycle of the same cylinder.

It is to be noted that in cases where a pair of purge valves 8A and 8B are employed as in the embodiment described above, the maximum purge gas flow rate is achieved by both the two purge valves 8A and 8B. Therefore, as compared to cases where a single purge valve 8 is employed, there is an advantage that it is possible to employ a small-capacity solenoid valve which is highly responsive in general.

Furthermore, although the above embodiment is an application to a supercharged engine equipped with a turbocharger, the present invention may be similarly applied to naturally-aspirated engines.

The invention claimed is:

1. A purge valve control method for an evaporative fuel processing device, wherein the evaporative fuel processing device includes at least one purge valve disposed in a purge passage between a canister and an intake passage of an internal combustion engine and configured to be duty-controlled, the purge valve control method comprising:

synchronizing a cycle, in which the at least one purge valve is opened, with rotation of the internal combustion engine;

setting a valve opening interval at one half of an odd number times an intake stroke interval, wherein the valve opening interval is from a start point of a first opening time period of the at least one purge valve to a start point of a second opening time period of the at least one purge valve, wherein the second opening time period follows the first opening time period, wherein the intake stroke interval is determined by a number of cylinders of the internal combustion engine; and setting the odd number to a value of a mathematical expression of (2·C+1), wherein C represents the number of cylinders of the internal combustion engine.

2. The purge valve control method as claimed in claim 1, wherein the at least one purge valve includes a first purge valve and a second purge valve, wherein the first purge valve and the second purge valve are arranged in parallel with each other, the purge valve control method comprising:

opening the first purge valve and the second purge valve alternately such that the valve opening interval set at the one half of the odd number times the quantity is from a start point of an opening time period of the first purge valve to a start point of an opening time period of the second purge valve, wherein the opening time period of the second purge valve follows the opening time period of the first purge valve.

3. The purge valve control method as claimed in claim 2, comprising:

driving the first purge valve and the second purge valve at equal duty ratios.

4. The purge valve control method as claimed in claim 2, wherein the purge passage includes a first purge passage section from the intake passage to the first purge valve, and a second purge passage section from the intake passage to the second purge valve, the purge valve control method comprising:

setting the first purge passage section and the second purge passage section equal in length to each other.

5. The purge valve control method as claimed in claim 3, wherein the purge passage includes a first purge passage section from the intake passage to the first purge valve, and a second purge passage section from the intake passage to the second purge valve, the purge valve control method comprising:

setting the first purge passage section and the second purge passage section equal in length to each other.

6. The purge valve control method as claimed in claim 1, comprising:

setting the first opening time period and the second opening time period such that a waveform of intake pulsation has a peak in the first opening time period and has a valley in the second opening time period.

7. The purge valve control method as claimed in claim 2, comprising:

setting the first opening time period and the second opening time period such that a waveform of intake pulsation has a peak in the first opening time period and has a valley in the second opening time period.

8. The purge valve control method as claimed in claim 3, comprising:

setting the first opening time period and the second opening time period such that a waveform of intake pulsation has a peak in the first opening time period and has a valley in the second opening time period.

9. The purge valve control method as claimed in claim 4, comprising:

setting the first opening time period and the second opening time period such that a waveform of intake pulsation has a peak in the first opening time period and has a valley in the second opening time period.

10. The purge valve control method as claimed in claim 5, comprising:

setting the first opening time period and the second opening time period such that a waveform of intake pulsation has a peak in the first opening time period and has a valley in the second opening time period.

11. A purge valve control device for an evaporative fuel processing device, comprising:

a canister structured to adsorb evaporative fuel;

at least one purge valve disposed in a purge passage between the canister and an intake passage of an internal combustion engine; and a controller configured to duty-control the at least one purge valve;

wherein the controller is configured to drive the at least one purge valve by:

synchronizing a cycle, in which the at least one purge valve is opened, with rotation of the internal combustion engine;

setting a valve opening interval at one half of an odd number times an intake stroke interval, wherein the valve opening interval is from a start point of a first opening time period of the at least one purge valve to a start point of a second opening time period of the at least one purge valve, wherein the second opening time period follows the first opening time period, wherein the intake stroke interval is determined by a number of cylinders of the internal combustion engine; and setting the odd number to a value of a mathematical expression of $(2 \cdot C+1)$, wherein C represents the number of cylinders of the internal combustion engine.

* * * * *